United States Patent
Lee et al.

(10) Patent No.: US 8,363,932 B2
(45) Date of Patent: Jan. 29, 2013

(54) APPARATUS AND METHOD OF REMOVING FALSE COLOR IN IMAGE

(75) Inventors: Ho Jin Lee, Seoul (KR); Young Su Moon, Seoul (KR); Shi Hwa Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 337 days.

(21) Appl. No.: 12/805,864

(22) Filed: Aug. 20, 2010

(65) Prior Publication Data
US 2011/0091100 A1 Apr. 21, 2011

(30) Foreign Application Priority Data

Oct. 20, 2009 (KR) .................. 10-2009-0099609

(51) Int. Cl.
G06K 9/00 (2006.01)
G06K 9/40 (2006.01)
(52) U.S. Cl. ....................... 382/162; 382/275
(58) Field of Classification Search .................. None
See application file for complete search history.

(56) References Cited

U.S. PATENT DOCUMENTS

| 6,853,748 | B2 | 2/2005 | Endo et al. | |
| 7,034,869 | B2 | 4/2006 | Sugimori | |
| 7,983,511 | B1* | 7/2011 | Chan | 382/275 |
| 2004/0252907 | A1* | 12/2004 | Ito | 382/260 |
| 2006/0170798 | A1* | 8/2006 | Lee et al. | 348/272 |
| 2007/0002154 | A1* | 1/2007 | Kang et al. | 348/272 |
| 2009/0303357 | A1* | 12/2009 | Tajima et al. | 348/246 |

FOREIGN PATENT DOCUMENTS

| JP | 6-260889 | 9/1994 |
| JP | 9-18746 | 1/1997 |
| JP | 10-178560 | 6/1998 |
| JP | 2004-173060 | 6/2004 |
| JP | 2004-214756 | 7/2004 |
| JP | 2009-147937 | 7/2009 |
| KR | 10-2007-0000982 | 1/2007 |

OTHER PUBLICATIONS

Lanlan Chang et al., "Hybrid color filter array demosaicking for effective artifact suppression", Journal of Electronic Imaging, Jan.-Mar. 2006/vol. 15(1).

* cited by examiner

Primary Examiner — Li Liu
(74) Attorney, Agent, or Firm — Staas & Halsey LLP (57) ABSTRACT

An image processing method and apparatus is provided, with which a size of a filter window may be decreased by determining an edge direction of each of the pixels constituting an image and by vertically applying an anisotropic filter window to the determined edge direction.

17 Claims, 7 Drawing Sheets

<EDGE OF VERTICAL DIRECTION>

FIG. 4B

<EDGE OF HORIZONTAL DIRECTION>

FIG. 6

APPARATUS AND METHOD OF REMOVING FALSE COLOR IN IMAGE

CROSS-REFERENCE TO RELATED APPLICATIONS

This application claims the benefit of Korean Patent Application No. 10-2009-0099609, filed on Oct. 20, 2009, in the Korean Intellectual Property Office, the disclosure of which is incorporated herein by reference.

BACKGROUND

1. Field

One or more embodiments of the present disclosure relate to an image processing method and apparatus, and more particularly, to an image processing method and apparatus that may remove a false color in an input image.

2. Description of the Related Art

When photographing a subject using a digital photographing device, an image obtained via an image sensor may generally include a false color. False color refers to a color that does not exist in the subject, which however, appears in an output image. Generally, a false color phenomenon may frequently occur around an edge portion. When an edge area includes an achromatic color, the false color phenomenon may be particularly noticeable. The false color may cause a qualitative deterioration in screen quality. Accordingly, there is a desire for a technology that may decrease the false color phenomenon to obtain an image color that is the same or similar to that of the subject.

SUMMARY

According to an aspect of one or more embodiments, there may be provided an image processing apparatus including a map generator to generate a color difference map based on a color difference value between a reference channel image and each of remaining channel images among input channel images, an edge direction decision unit to determine an edge direction of each of pixels constituting the reference channel image, a filtering unit to perform filtering for the color difference map after applying an anisotropic filter window to each of pixels constituting the color difference map, based on the determined edge direction, and an image restoration unit to restore the remaining channel images by adding the filtered color difference map and the reference channel image.

The map generator may calculate a luminance difference value between a pixel of the reference channel image and a pixel of each of the remaining channel images that are relatively located, and may generate a color difference map corresponding to each of the remaining channel images.

The edge direction decision unit may determine the edge direction of each pixel as any one of a vertical direction and a horizontal direction based on a gradient of each pixel.

The filtering unit may apply the anisotropic filter window of the horizontal direction to a pixel of which the edge direction is determined as the vertical direction, and may apply the anisotropic filter window of the vertical direction to a pixel of which the edge direction is determined as the horizontal direction.

The edge direction decision unit may calculate the gradient of each pixel by comparing luminance values of pixels located around a corresponding pixel.

The filtering unit may apply median filtering to the color difference map.

The image processing apparatus may further include a filter to filter the reference channel image. The input channel images may include a red (R) channel image, a green (G) channel image, and a blue (B) channel image, and the reference channel image may correspond to the G channel image.

According to another aspect of one or more embodiments, there may be provided an image processing method including generating a color difference map based on a color difference value between a reference channel image and each of remaining channel images among input channel images, determining an edge direction of each of pixels constituting the reference channel image, performing filtering for the color difference map after applying an anisotropic filter window to each of pixels constituting the color difference map, based on the determined edge direction, and restoring the remaining channel images by adding the filtered color difference map and the reference channel image.

The generating may include calculating a luminance difference value between a pixel of the reference channel image and a pixel of each of the remaining channel images that are relatively located, and generating a color difference map corresponding to each of the remaining two channel images.

The determining may include determining the edge direction of each pixel as any one of a vertical direction and a horizontal direction based on a gradient of each pixel.

The filtering may include applying the anisotropic filter window of the horizontal direction to a pixel of which the edge direction is determined as the vertical direction, and applying the anisotropic filter window of the vertical direction to a pixel of which the edge direction is determined as the horizontal direction.

The determining may include calculating the gradient of each pixel by comparing luminance values of pixels located around a corresponding pixel.

The filtering may include applying median filtering to the color difference map.

The image processing method may further include filtering the reference channel image.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects and advantages will become apparent and more readily appreciated from the following description of the exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

Figure 1:
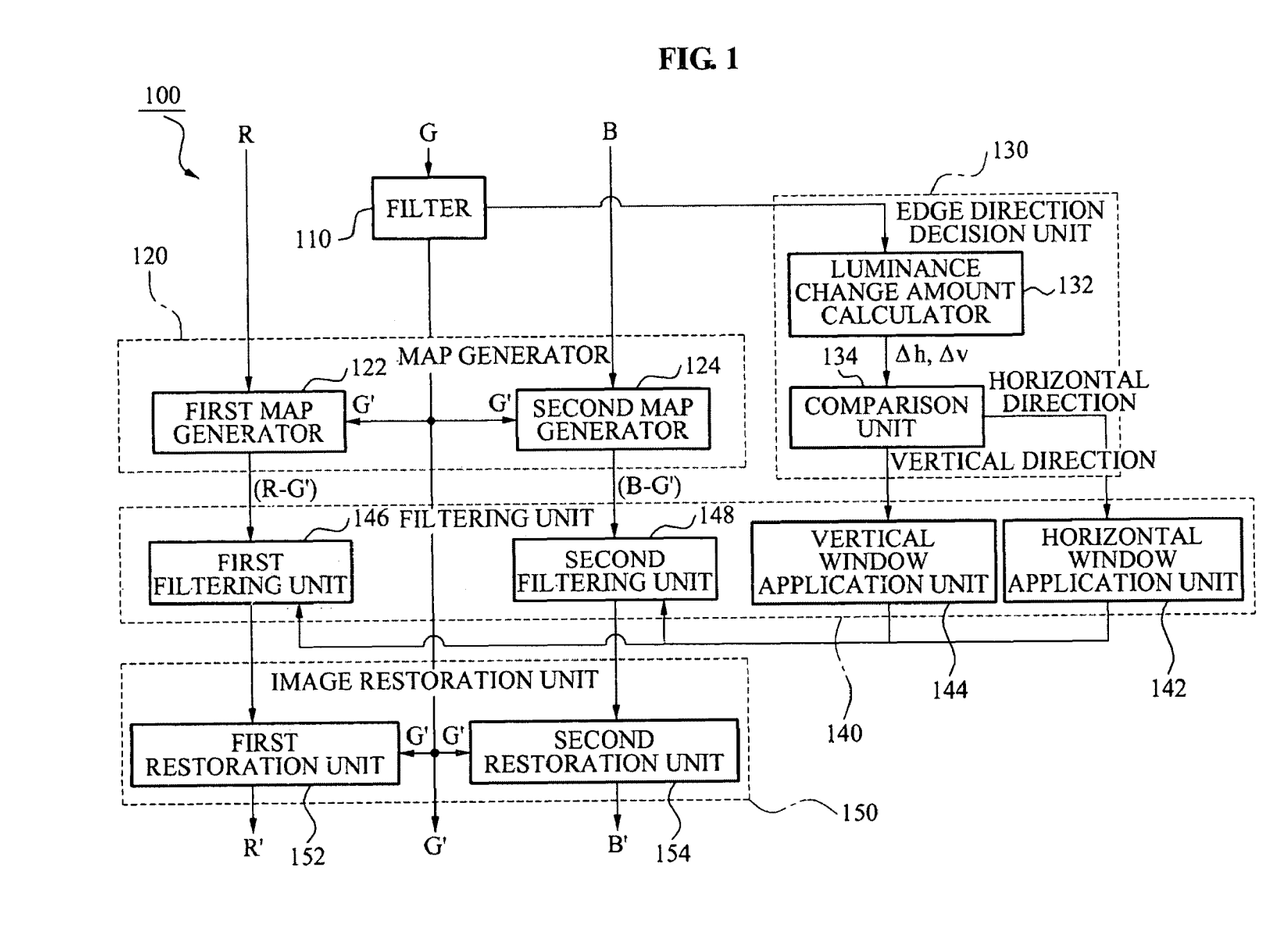
FIG. 1 illustrates an image processing apparatus according to an embodiment.

FIG. 1 illustrates an image processing apparatus 100 according to an embodiment.

The image processing apparatus 100 may remove a false color when an input red, green, and blue (RGB) image is displayed for a user, and thus may be applicable to electronic, devices associated with an image. The image processing apparatus 100 may be applicable to various types of electronic devices, for example, a digital camera, a camcorder, a mobile phone, a personal computer, a television, a set-top box, and the like.

The image processing apparatus 100 may include, for example, a filter 110, a map generator 120, an edge direction decision unit 130, a filtering unit 140, and an image restoration unit 150. An image input into the image processing apparatus 100 may correspond to an R channel image (R), a G channel image (G), or a B channel image (B). However, the described image type is only an example and thus an image of various other types such as cyan-magenta-yellow-black (CMYK), YCbCr, and the like may be also be applicable. Among the R channel image (R), the G channel image (G), and the B channel image (B), the G channel image (G) will be described herein as an example of a reference channel image, however, another channel image may be utilized as the reference channel image depending on characteristics of a device to be applied. The reference channel image may be set up in a manufacturing operation of the image processing apparatus 100.

The filter 110 may filter an image corresponding to a G channel set as a reference channel, that is, may filter the G channel image (G). For example, the filter 110 may apply Gaussian filtering, low pass filtering (LPF), and the like to the G channel image (G). The filtered G channel image (G') (hereinafter "G channel image (G')") may be input into the map generator 120, the edge direction decision unit 130, and the image restoration unit 150.

The filter 110 may be selectively applied. Accordingly, when the filter 110 is not applied, the G channel image (G) may be input into the map generator 120, the edge direction decision unit 130, and the image restoration unit 150.

The map generator 120 may generate a color difference map based on a color difference value between the reference channel image and each of the remaining two channel images among the R channel image, the G channel image, and the B channel image. The map generator 120 may include, for example, a first map generator 122 and a second map generator 124.

The first map generator 122 may receive the R channel image (R) and the G channel image (G') set as the reference channel image. In this instance, the first map generator 122 may also receive a luminance value for each of the pixels constituting the R channel image (R) and the G channel image (G'). The first map generator 122 may calculate a luminance difference value between a pixel of the R channel image (R) and a pixel of the G channel image (G') that are relatively located, and may generate a first color difference map R–G' based on the calculation result.

Figure 2:
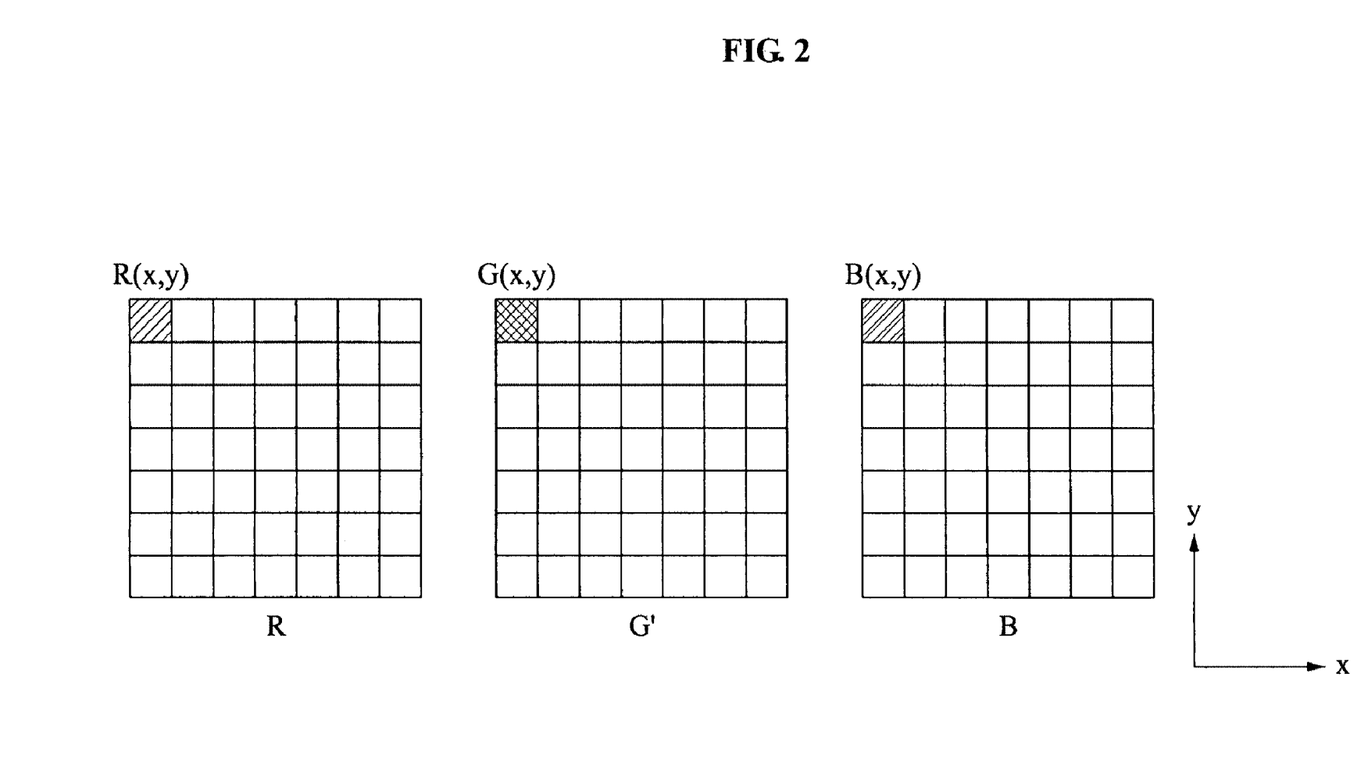
FIG. 2 illustrates a red (R) channel image, a green (G) channel image, and a blue (B) channel image input at the same point in time according to an embodiment.

FIG. 2 illustrates an R channel image (R), a G channel image (G'), and a B channel image (B) input at the same point in time according to an embodiment.

The R channel image (R), the G channel image (G'), and the B channel image (B) may have the same size. The first map generator 122 may verify a luminance value of a pixel located at R(x, y) of the R channel image (R), and verify a luminance value of a pixel located at G(x, y) of the G channel image (G') and then calculate a luminance difference value between the verified two pixels. When the R channel image (R) and the G channel image (G') overlap each other, the location of R(x, y) and the location of G(x, y) may match.

Similarly, the second map generator 124 may receive the B channel image (B) and the G channel image (G'). The second map generator 124 may also receive a luminance value for each of the pixels constituting the B channel image (B) and the G channel image (G'). The second map generator 124 may calculate a luminance difference value between a pixel of the B channel image (B) and a pixel of the G channel image (G'), which are relatively located, and may generate a second color difference map B–G' based on the calculation result.

For example, referring to FIG. 2, the second map generator 124 may verify a luminance value of a pixel located at B(x, y) of the B channel image (B) and verify a luminance value of a pixel located at G(x, y) of the G channel image (G') and then calculate a luminance difference value between the verified two pixels. When the B channel image (B) and the G channel image (G') overlap each other, the location of B(x, y) and the location of G(x, y) may match.

The edge direction decision unit 130 may determine an edge direction for each of the pixels constituting the reference channel image. Specifically, the edge direction decision unit 130 may receive the G channel image (G') corresponding to the reference channel image, and may determine the edge direction of each of the pixels, based on a gradient of a corresponding pixel. The edge direction decision unit 130 may include, for example, a luminance change amount calculator 132 and a comparison unit 134.

The luminance change amount calculator 132 may compare luminance values of pixels neighboring a given pixel (hereinafter, a current pixel) that appears desirable for determining a current edge direction, among the pixels constituting the G channel image (G'), and may calculate a gradient of the current pixel. When the gradient of the current pixel is calculated, the luminance change amount calculator 132 may calculate a gradient of a subsequent pixel and calculate gradients of all the pixels constituting the G channel image (G').

Figure 3A:
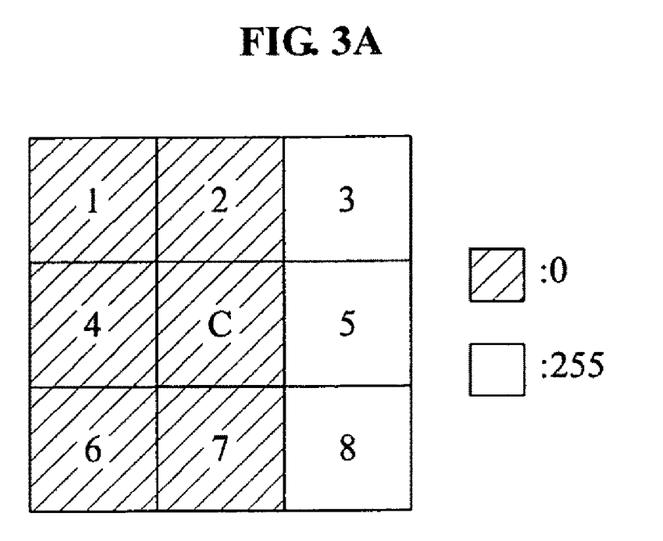
FIGS. 3A and 3B illustrate an example of a current pixel and neighboring pixels in a G channel image according to an embodiment.
Figure 3B:
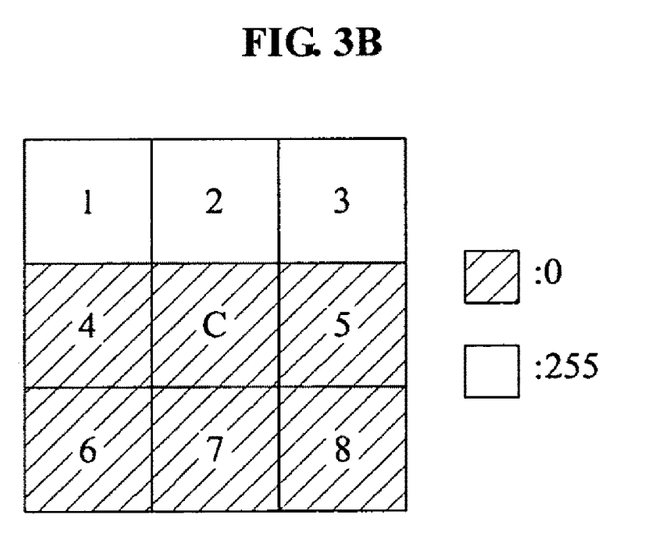

FIGS. 3A and 3B illustrate an example of a current pixel and neighboring pixels in a G channel image (G') according to an embodiment.

Referring to FIG. 3A, c denotes the current pixel, and 1 through 8 denote the neighboring pixels of the current pixel c. The luminance change amount calculator 132 may calculate Δh that is a luminance level difference such as a luminance value difference between the pixels 4 and 5 that are located on the left and the right of the current pixel c, respectively. The luminance change amount calculator 132 may calculate Δv such as a luminance value difference between the pixels 2 and 7 that are located above and below the current pixel c.

Δh denotes a luminance change amount of pixels located in the horizontal direction based on the current pixel c, and Δv denote a luminance change amount of pixels located in the vertical direction based on the current pixel c. Δh and Δv may each be expressed as an absolute value. Accordingly, Δh/Δv may be a gradient of a pixel. For example, when a luminance level is expressed as a value between zero and 255, pixels 3, 5, and 8 may be white with a luminance level of 255, and pixels 1, 2, 4, 6, 7, and c may be black with a luminance level of zero. Here, the luminance change amount calculator 132 may calculate $\Delta h=$|luminance value of pixel 4−luminance value of pixel 5|=|0−255|=255, and may calculate $\Delta v=$|luminance value of pixel 2−luminance value of pixel 7|=|0−0|=0.

Referring to FIG. 3B, pixels 1, 2, and 3 may be white with luminance levels of 255, and pixels 4, 5, 6, 7, 8, and c may be black with luminance levels of zero. The luminance change amount calculator 132 may calculate h=|luminance value of pixel 4−luminance value of pixel 5|=|0−0|=0, and may calculate $\Delta v=$|luminance value of pixel 2−luminance value of pixel 7|=|255−0|=255.

Referring again to FIG. 1, the comparison unit 134 may compare $\Delta h$ and $\Delta v$ of the current pixel c that are calculated by the luminance change amount calculator 132. As a comparison result, when $\Delta h \geq \Delta v$, the comparison unit 134 may determine that an edge direction of the current pixel c corresponds to a vertical direction, and output the decision result to a horizontal window application unit 142. Conversely, when $\Delta h < \Delta v$, the comparison unit 134 may determine that the edge direction of the current pixel c corresponds to a horizontal direction, and output the decision result to a vertical window application unit 144.

In FIG. 3A, $\Delta h=255$ and $\Delta v=0$ and thus the edge direction of the current pixel c corresponds to the vertical direction. In FIG. 3B, $\Delta h=0$ and $\Delta v=255$ and thus the edge direction of the current pixel c corresponds to the horizontal direction.

As described above, the luminance change amount calculator 132 may calculate the luminance change amount by comparing luminance values of neighboring pixels of the current pixel c, and may also calculate the luminance change amount by calculating a first differential coefficient or a second differential coefficient.

The first differential coefficient may be utilized to calculate a luminance value difference between the current pixel c and pixel 4 located on the left of the current pixel c, calculate a luminance value difference between the current pixel c and pixel 5 located on the right of the current pixel c and then calculate an average luminance value difference as $\Delta h$. Similarly, the first differential coefficient may be utilized to calculate a luminance value difference between the current pixel c and pixel 2 located on up of the current pixel c, and calculate a luminance value difference between the current pixel c and pixel 7 located on down of the current pixel c, and then calculate an average luminance value difference as $\Delta v$.

The second differential coefficient may be utilized to calculate, as $\Delta h$, (luminance value of current pixel×2)−(luminance value of pixel 4+luminance value of pixel 5), and calculate, as $\Delta v$, (luminance value of current pixel×2)−(luminance value of pixel 2+luminance value of pixel 7). The comparison unit 134 may compare $\Delta h$ and $\Delta v$ that are calculated using one of the above two schemes, and determine a gradient of each pixel, that is, the edge direction.

Referring again to FIG. 1, the filtering unit 140 may apply an anisotropic filter window to each of the pixels constituting a color difference map, for example, the first color difference map R−G' and the second color difference map B−G', based on the determined edge direction and then filter the color difference map.

The filtering unit 140 may include, for example, the horizontal window application unit 142, the vertical window application unit 144, a filtering unit 146, and a second filtering unit 148.

The horizontal window application unit 142 and the vertical window application unit 144 may apply a filter window to the current pixel based on information associated with the edge direction of the current pixel, input from the comparison unit 134. For example, the horizontal window application unit 142 and the vertical window application unit 144 may vertically apply the anisotropic filter window to the edge direction of the current pixel.

Figure 4A:
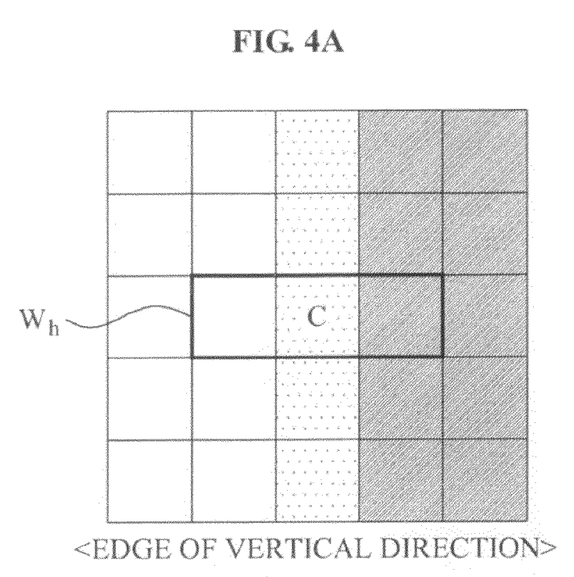
FIGS. 4A and 4B illustrate an example of applying an anisotropic filter according to an embodiment.
Figure 4B:
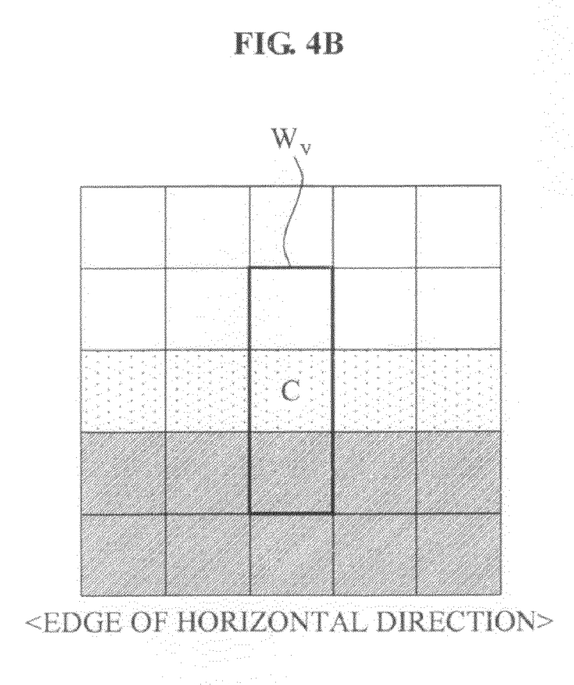

The edge direction of the current pixel c input into the horizontal window application unit 142 corresponds to the vertical direction. Accordingly, as shown in FIG. 4A, the horizontal window application unit 142 may apply the anisotropic filter window of the horizontal direction (hereinafter, "horizontal window") $w_h$ to the current pixel c. The horizontal window $w_h$ may have a size of N×M, and may have various sizes, for example, 1×3, 3×9, and the like. FIGS. 4A and 4B show an added image of the R channel image, the G channel image (G'), and the B channel image (B). In FIGS. 4A and 4B, a false color is indicated by dots.

The edge direction of the current pixel c input into the vertical window application unit 144 corresponds to the horizontal direction. Accordingly, as shown in FIG. 4B, the vertical window application unit 144 may apply the anisotropic filter window of the vertical direction (hereinafter, "vertical window") $w_v$ to the current pixel c. The vertical window $w_v$ may have a size of N×M, and may have various sizes, for example, 1×3, 3×9, and the like. The size of the vertical window $w_v$ may be the same as or different from the size of the horizontal window $w_h$.

The horizontal window application unit 142 may provide the first filtering unit 146 and the second filtering unit 148 with information indicating the horizontal window $w_h$ is applied to the current pixel c, and location information of the current pixel c. The vertical window application unit 144 may provide the first filtering unit 146 and the second filtering unit 148 with information indicating the vertical window $w_v$ is applied to the current pixel c and location information of the current pixel c.

The horizontal window application unit 142 and the vertical window application unit 144 may apply the horizontal window $w_h$ and the vertical window $w_v$ to each of all the pixels constituting the G channel image (G'), and provide the first filtering unit 146 and the second filtering unit 148 with related information.

Accordingly, an anisotropic filter window corresponding to each of the pixels constituting the first color difference map R−G' may be input into the first filtering unit 146. The same scheme may be applied to the second filtering unit 148.

The first filtering unit 146 may apply filtering to the first color difference map R−G'. A filtering scheme may include, for example, medial filtering and the like. Based on information input from the horizontal window application unit 142 and the vertical window application unit 144, the first filtering unit 146 may perform vertical filtering for a pixel of which an edge direction is a vertical direction, and may perform horizontal filtering for a pixel of which an edge direction is a horizontal direction among the pixels constituting the first color difference map R−G'.

Specifically, the first filtering unit 146 may verify a pixel corresponding to a relative location of a current pixel of the first color difference map R−G' from pixel location information input from the horizontal window application unit 142 and the vertical window application unit 144, and may be aware of a type of an anisotropic filter window applied to the verified pixel. When the type of the anisotropic filter window applied to the verified pixel corresponds to the vertical window $w_v$, the first filtering unit 146 may perform vertical filtering for the pixel. When the type of the anisotropic filter window applied to the verified pixel corresponds to the horizontal window $w_h$, the first filtering unit 146 may perform horizontal filtering for the pixel.

The second filtering unit 148 may perform filtering for the second color difference map B−G'. A filtering scheme may include, for example, medial filtering and the like. Based on information input from the horizontal window application unit 142 and the vertical window application unit 144, the second filtering unit 148 may perform vertical filtering for a pixel of which an edge direction is a vertical direction, and may perform horizontal filtering for a pixel of which an edge direction is a horizontal direction among the pixels constituting the second color difference map B−G'. Description related thereto will be the same as description related to the first filtering unit 146 and thus further detailed description will be omitted here.

The image restoration unit 150 may restore each channel image by adding the reference channel image and at least one color difference map filtered by the filtering unit 140. The image restoration unit 150 may include a first restoration unit 152 and a second restoration unit 154.

The first restoration unit 152 may restore an R channel image (R') by adding the G channel image (G') and a filtered first color difference map R−G' that is input from the first filtering unit 146. The restored R channel image R' and the input R channel image R may be the same as each other, or may be partially different.

The second restoration unit 154 may restore a B channel image (B') by adding the G, channel image (G') and a filtered second difference map B−G' that is input from the second filtering unit 148. The restored B channel image (B') and the input B channel image (B) may be the same as each other, or may be partially different.

Figure 5:
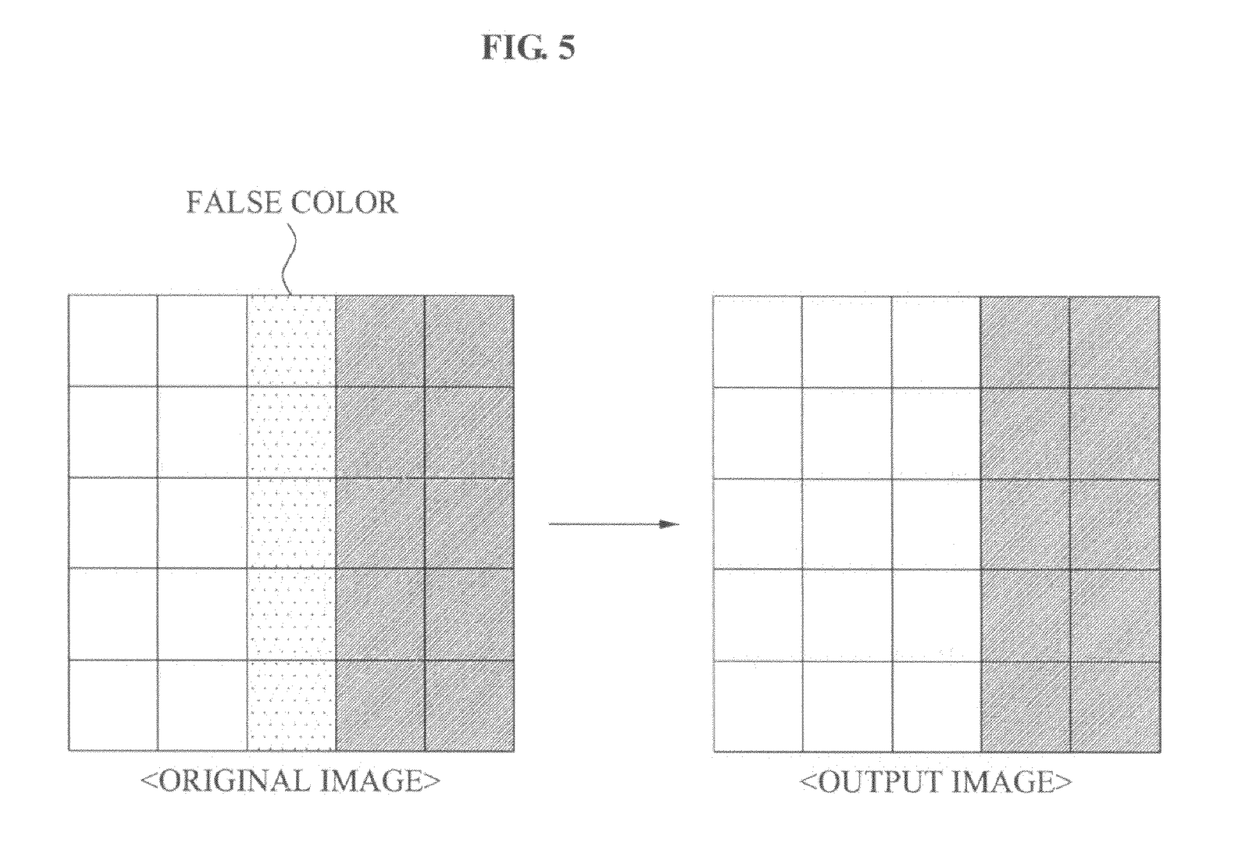
FIG. 5 illustrates an example of an image including a false color and an image in which the false color is removed according to an embodiment.

FIG. 5 illustrates an example of an image including a false color and an image in which the false color is removed according to an embodiment.

Referring to FIG. 5, an original image includes an R channel image (R), a G channel image (G), and a B channel image (B), and includes a false color in an edge of a vertical direction. The original image may be output by removing the false color from the edge of the vertical direction using the image processing apparatus 100 of FIG. 1.

In FIG. 5, when the image processing apparatus 100 corresponds to a digital photographing device such as a digital camera, the original image may be an input image output by color filter array (CFA) interpolation processing.

Hereinafter, an image processing method will be described with reference to the accompanying drawings.

Figure 6:
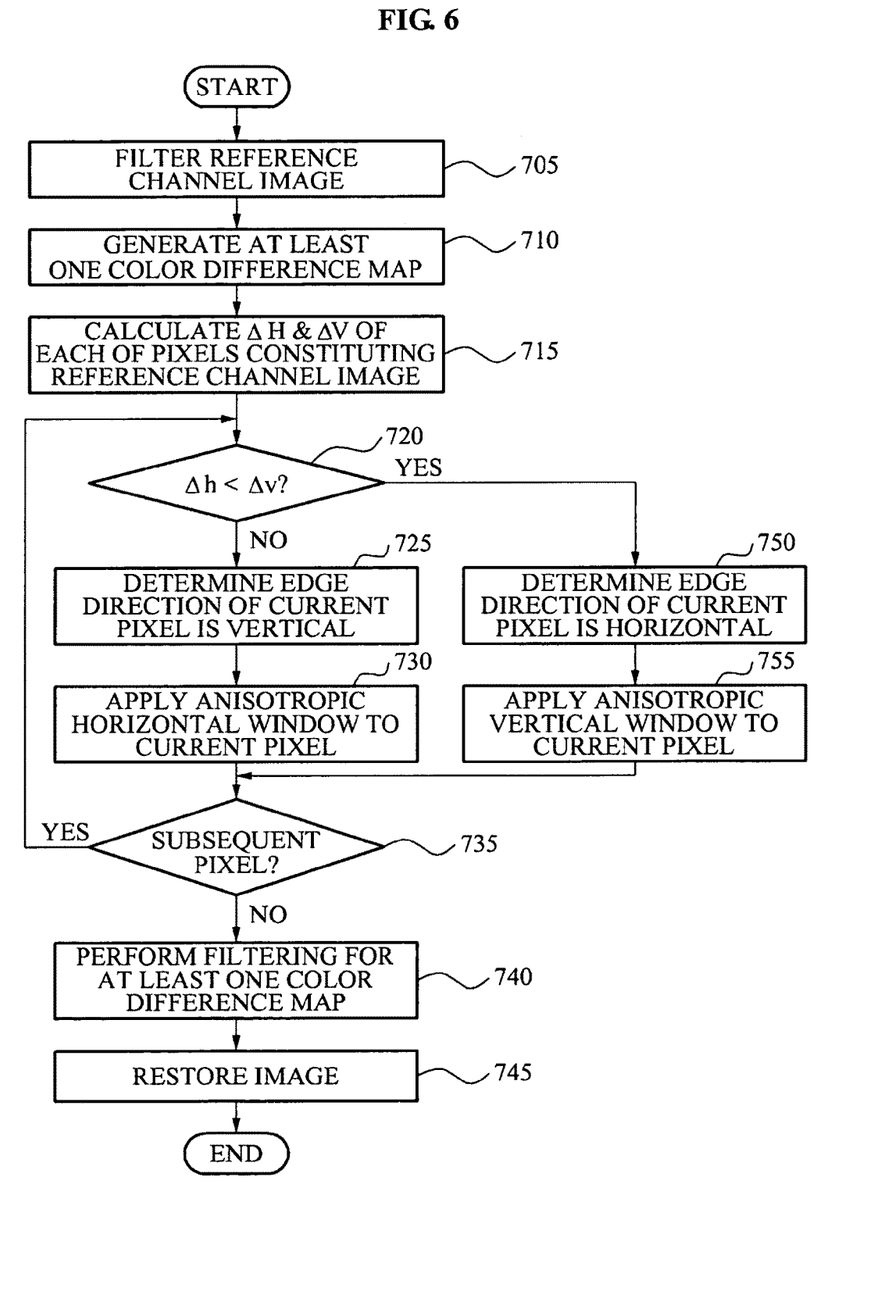
FIG. 6 illustrates an image processing method according to an embodiment.

FIG. 6 illustrates an image processing method according to an embodiment.

Referring to FIG. 1 through FIG. 6, in operation 705, a reference channel image may be filtered, e.g., by the filter 110. The reference channel image may be determined as one of an R channel image (R), a G channel image (G), and a B channel image (B). In this example, the G channel image (G) is set as the reference channel image.

In operation 710, at least one color difference, map may be generated, e.g., by the map generator 120, by calculating a color difference value between the filtered G channel image (G') and each of the R channel image (R) and the B channel image (B). For example, the map generator 120 may generate a first color difference map corresponding to R−G' and a second color difference map corresponding to B−G'.

In operation 715, a luminance change amount for each pixel may be calculated, e.g.; by the luminance change amount calculator 132, by comparing luminance values of pixels located around each of the pixels constituting the filtered G channel image (G'). The calculated luminance change amount may include Δh, which is a change amount with respect to a horizontal direction, and Δv, which is a change amount with respect to a vertical direction.

In operation 720, Δh and Δv of each pixel may be compared, e.g., by the comparison unit 134. When Δh≧Δv, the comparison unit 134 may determine an edge direction of the current pixel corresponds to a vertical direction, and output the decision result to the horizontal window application unit 142 in operation 725. Here, the current pixel denotes a pixel currently processed among pixels.

In operation 730, a horizontal window wh may be applied, e.g., by the horizontal window application unit 142, to the current pixel of which the edge direction is the vertical direction as shown in FIG. 4A.

When a subsequent pixel that appears desirable for determining the edge direction exists in operation 735, operation 720 may be performed.

Conversely, when the subsequent pixel does not exist, filtering may be performed, e.g., by the first filtering unit 146 and the second filtering unit 148, for the at least one color difference map, for example, the first color difference map R−G' and the second difference map B−G' in operation 740.

In operation 745, an R channel image (R') may be restored, e.g., by the image restoration unit 150, by adding the filtered first color difference map R−G' and the G channel image (G'), and a B channel image (B') may be restored by adding the filtered second color difference map B−G' and the G channel image (G').

Conversely, when Δh<Δv in operation 720, it may be determined, e.g., by the comparison unit 134, that the edge direction of the current pixel corresponds to a horizontal direction and the decision result may be output, e.g., to the vertical window application unit 144 in operation 750.

In operation 755, a vertical window wv may be applied, e.g., by the vertical window application unit 144, to the current pixel of which the edge direction is determined as the horizontal direction, as shown in FIG. 4B.

An image may be filtered and restored by applying an anisotropic filter window to all the pixels included in a single frame or a single field constituting the image through the above process. Accordingly, a false color may be removed using a simple calculation.

Figure 7:
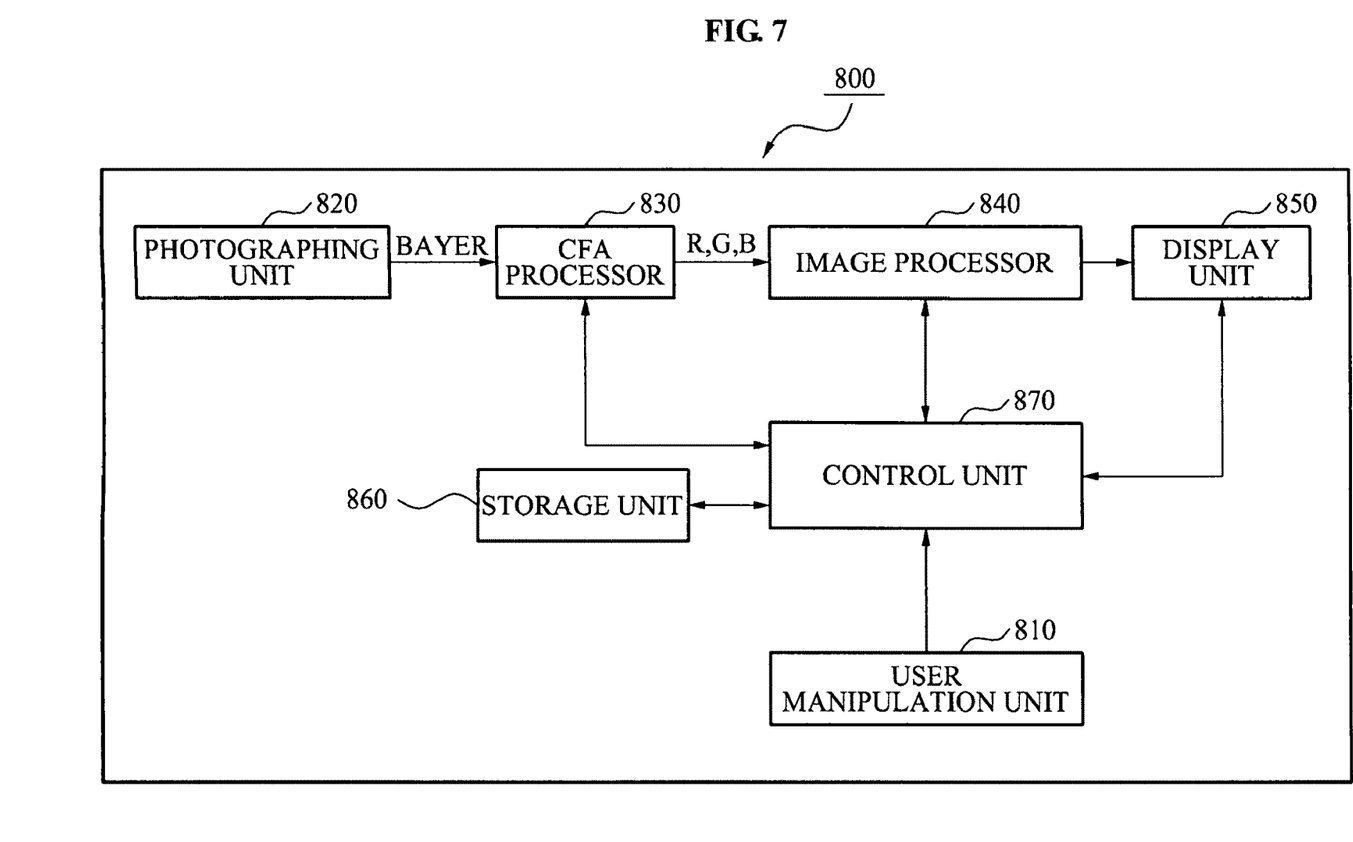
FIG. 7 illustrates a digital photographing device according to an embodiment.

FIG. 7 illustrates a digital photographing device 800 according to an embodiment.

The digital photographing device 800 may include, for example, a digital camera, a digital camcorder, a mobile device having a camera function, and the like. The digital photographing device 800 may include, for example, a user manipulation unit 810, a photographing unit 820, a CFA processor 830, an image processor 840, a display unit 850, a storage unit 860, and a control unit 870.

The user manipulation unit 810 corresponds to a user interface, and may include various types of buttons, for example, a power button, a direction button, a zooming button, a touch screen, and the like.

The photographing unit 820 may photograph a subject to output an image in an RGB format. The photographing unit 820 may include an analog-to-digital converter (ADC) and an image sensor, for example, a shutter, an optical lens, a diaphragm, and a charge coupled device (CCD). An image output from the image sensor of the photographing device 820 may be a bayer image.

The CFA processor 830 may classify the input bayer image into an R channel image, a G channel image, and a B channel image.

The image processor 840 may receive the R channel image, the G channel image, and the B channel image from the CFA processor 830, and process the received R channel image, G channel image, and B channel image as displayable signals. In particular, the image processor 840 may remove a false color by applying an anisotropic filter window to an image set as a reference channel image among the R channel image, the G channel image, and the B channel image. The image processor 840 may be the same as or similar to the image processing apparatus 100 of FIG. 1, and thus further detailed description related thereto will be omitted here. The image processor 840 may be provided as an image signal processor or a digital signal processor.

The display unit 850 may display the output image.

The storage unit 860 may temporarily or permanently store the image.

The control unit 870 may control each of the above constituent elements to perform the aforementioned operation using a control program, an application program, and the like.

According to an embodiment, compared to a case of applying an isotropic filter window, it is possible to decrease a size of a filter window by determining an edge direction of each of pixels constituting an image and by vertically applying an anisotropic filter window to a determined edge direction.

Also, according to an embodiment, since filtering is vertically performed for a determined edge direction, it is possible to more effectively remove a false color, and to decrease a jagged edge occurrence. This is because the false color generally occurs in the same direction as an edge, around the edge.

Also, according to an embodiment, since an anisotropic filter window is adaptively applied based on an edge direction of each pixel, it is possible to perform filtering using a simple calculation. In addition, since the edge direction of each pixel is determined as any one of a vertical direction and a horizontal direction, it is possible to simplify and decrease a calculation utilized for removing the false color.

Also, according to an embodiment, since a uniform calculation is applied to remove a false color, it is possible to be optimal when providing an image processing apparatus as hardware or software such as a digital signal processor.

The image processing method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa. The instructions may be executed on any processor, general purpose computer, or special purpose computer including an image processing apparatus and the software modules may be controlled by any computer/processor.

Although a few exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. An image processing apparatus comprising:
   a processor to control one or more processor-executable units;
   a map generator to generate a color difference map based on a color difference value between a reference channel image and each of remaining channel images among input channel images;
   an edge direction decision unit to determine an edge direction for each of the pixels constituting the reference channel image;
   a filtering unit to filter the color difference map after applying an anisotropic filter window to each of the pixels constituting the color difference map, based on the determined edge direction; and
   an image restoration unit to restore one or more of the remaining channel images by adding the filtered color difference map and the reference channel image.

2. The image processing apparatus of claim 1, wherein:
   the map generator calculates a luminance difference value between a pixel of the reference channel image and a pixel of each of the remaining channel images that are relatively located, and generates a color difference map corresponding to each of the remaining channel images.

3. The image processing apparatus of claim 1, wherein the edge direction decision unit determines the edge direction of each pixel as any one of a vertical direction and a horizontal direction based on a gradient of each pixel.

4. The image processing apparatus of claim 3, wherein the edge direction decision unit calculates the gradient of each pixel by comparing luminance values of pixels surrounding a corresponding pixel.

5. The image processing apparatus of claim 3, wherein the filtering unit applies the anisotropic filter window of the horizontal direction to a pixel in which the edge direction is determined as the vertical direction, and applies the anisotropic filter window of the vertical direction to a pixel in which the edge direction is determined as the horizontal direction.

6. The image processing apparatus of claim 1, wherein the filtering unit applies median filtering to the color difference map.

7. The image processing apparatus of claim 1, further comprising:
   a filter to filter the reference channel image.

8. The image processing apparatus of claim 1, wherein:
   the input channel images include a red (R) channel image, a green (G) channel image, and a blue (B) channel image, and
   the reference channel image corresponds to one of the red (R) channel image, the green (G) channel image, and the blue (B) channel image.

9. An image processing method comprising:
   generating a color difference map based on a color difference value between a reference channel image and each of remaining channel images among input channel images;
   determining an edge direction for each of the pixels constituting the reference channel image;
   filtering the color difference map after applying an anisotropic filter window to each of the pixels constituting the color difference map, based on the determined edge direction; and restoring one or more of the remaining channel images by adding the filtered color difference map and the reference channel image.

10. The image processing method of claim 9, wherein the generating comprises calculating a luminance difference value between a pixel of the reference channel image and a pixel of each of the remaining channel images that are relatively located, and generating a color difference map corresponding to each of the remaining channel images.

11. The image processing method of claim 9, wherein the determining comprises determining the edge direction of each pixel as any one of a vertical direction and a horizontal direction based on a gradient of each pixel.

12. The image processing method of claim 11, wherein the determining comprises calculating the gradient of each pixel by comparing luminance values of pixels surrounding a corresponding pixel.

13. The image processing method of claim 11, wherein the filtering comprises applying the anisotropic filter window of the horizontal direction to a pixel in which the edge direction is determined as the vertical direction, and applying the anisotropic filter window of the vertical direction to a pixel in which the edge direction is determined as the horizontal direction.

14. The image processing method of claim 9, wherein the filtering comprises applying median filtering to the color difference map.

15. The image processing method of claim 9, further comprising:
filtering the reference channel image.

16. The image processing method of claim 9, wherein:
the input channel images include an R channel image, a G channel image, and a B channel image, and
the reference channel image corresponds to one of the red (R) channel image, the green (G) channel image, and the blue (B) channel image.

17. A non-transitory computer-readable recording medium storing a program to implement a method comprising:
generating a color difference map based on a color difference value between a reference channel image and each of remaining channel images among input channel images;
determining an edge direction for each of the pixels constituting the reference channel image;
filtering the color difference map after applying an anisotropic filter window to each of the pixels constituting the color difference map, based on the determined edge direction; and
restoring one or more of the remaining channel images by adding the filtered color difference map and the reference channel image.

* * * * *